March 7, 1939. M. L. SHULTZ 2,150,042
PIPE COUPLING
Filed Dec. 13, 1934
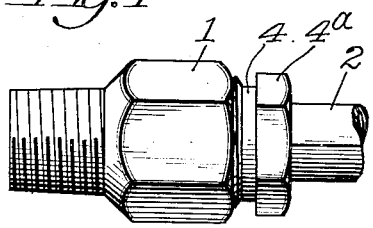
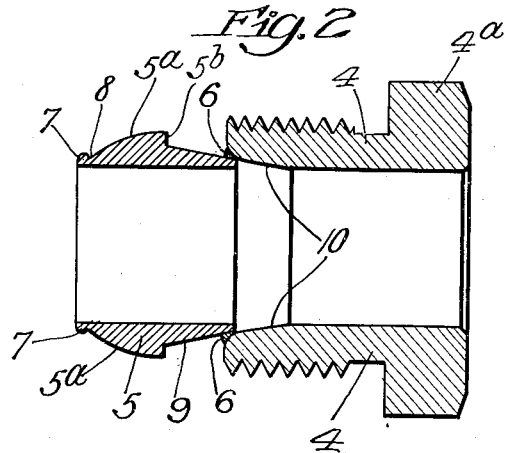
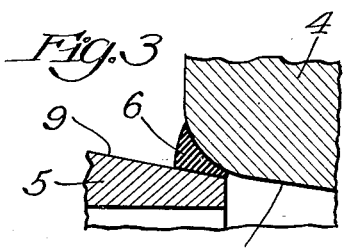
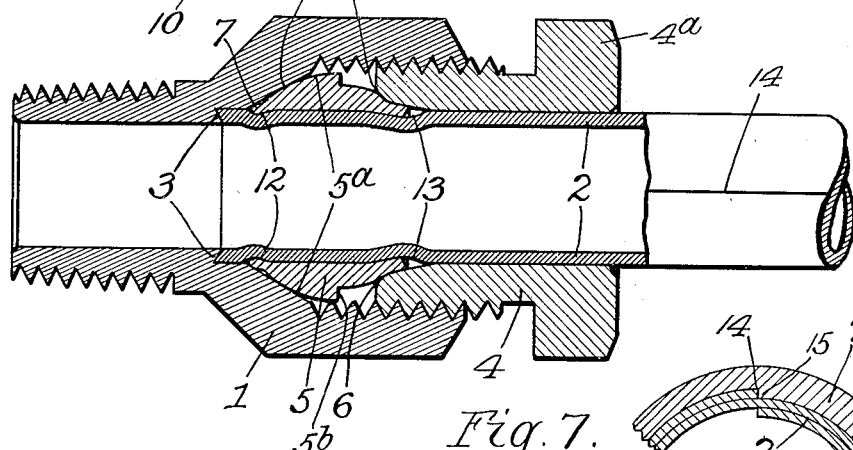
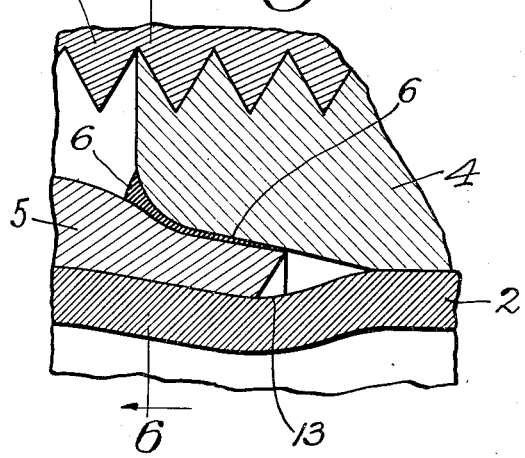
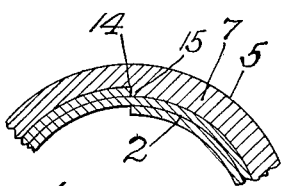
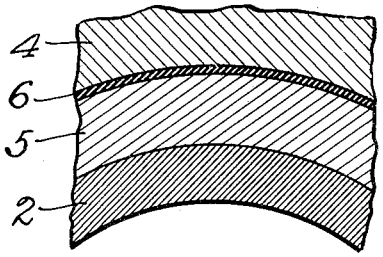
Inventor:
Michael L. Shultz
By Parker & Carter Attys.

Patented Mar. 7, 1939

2,150,042

UNITED STATES PATENT OFFICE 2,150,042

PIPE COUPLING

Michael L. Shultz, Chicago, Ill., assignor to The Dole Valve Company, Chicago, Ill., a corporation of Illinois Application December 13, 1934, Serial No. 757,263

2 Claims. (Cl. 285—166)

This invention relates to pipe couplings and has for its object to provide a new and improved device of this description.

One of the difficulties with a pipe coupling of this description is the danger of leakage through the coupling. One of the objects of the present invention is to provide a coupling of this kind which provides a tight joint which insures against leakage.

The invention has a further object to provide a pipe coupling which provides a multiple compression feature. The invention has as a further object to provide a pipe coupling wherein the coupling element has an arc shaped face which engages the associated coupling member. The invention has as a further object to provide a pipe coupling for easily, quickly and effectively connecting tubes or pipes which secures a tight and effective joint under all the varying conditions. The invention has further objects which are more particularly pointed out in the accompanying description.

Referring now to the drawing, Fig. 1 is a view showing one form of pipe coupling embodying the invention;

Fig. 2 is an enlarged longitudinal sectional view through one section of the pipe coupling;

Fig. 3 is an enlarged sectional view showing the soldered connection between the two members of Fig. 2;

Fig. 4 is an enlarged view in part section showing the parts when the pipe coupling is completed;

Fig. 5 is an enlarged view showing the solder between the members when the coupling is completed;

Fig. 6 is a sectional view taken on line 6—6 of Fig. 5;

Fig. 7 is a view showing the effect of the coupling when used with a pipe formed out of a sheet with the edges fastened together by an overlapping joint.

Like numerals refer to like parts throughout the several figures.

Referring now to the drawing, wherein I have shown one form of device embodying the invention, I have shown a member 1 which is laterally threaded and which is adapted to be attached to the part to which the pipe is to be connected. This member 1 has an enlarged opening into which is received the end of the pipe 2, this end abutting against a shoulder 3 which is preferably inclined as shown, that is, inclined from the inner portion outwardly and in a direction away from the pipe 2, forming as it were, an inclined recess for the end of this pipe.

A second externally threaded member 4 is provided to which is connected a clamping element 5, the clamping element being preferably connected to the member 4 by solder or other suitable material 6. The pipe 2 is fitted into the member 4 and the clamping element 5 until its end abuts against the inclined shoulder 3.

The clamping element 5 is provided at 5a with an inclined face which is curved or arc shaped. The clamping element 5 is provided at its end with a projection or annulus 7 which is separated from the main body of the clamping element by a reduced portion 8. The clamping element is provided at its other end with a reduced portion 9 which preferably has an inclined or conical shaped face, the end of the reduced portion fitting into the member 4. The member 4 has an inclined or conical shaped inner face 10 into which the inclined or conical shaped end 9 is received. The clamping element 5 is connected to the member 4 by solder or other suitable material, which is placed between the adjacent ends of the clamping element and the member 4, as shown in Fig. 2. This connects the clamping element and the member 4 together when being handled and transported before the joint is made. By connecting these parts together in this way, they are more easily handled and liability of injury to the part 5 is reduced.

The member 1 is provided with an inclined face 11 which engages the inclined face 5a of the member 5 when the parts are in their coupling position, as shown in Fig. 4.

When the coupling is made, the annulus 7 is bent inwardly so as to deform the pipe and form a groove 12 therearound, and the other end of the clamping element is bent so as to deform the pipe at a point separate from the point engaged by the projection 7, so as to form a groove 13 about the pipe. It will be noted, therefore, that there are two separated places where the clamping element deforms the pipe, one associated with each of the members 1 and 4. In other words, the clamping element has two pipe deforming parts spaced apart and preferably located at the opposite ends thereof which act upon the pipe to deform it to insure a tight joint in connection with the two coupling members 1 and 4.

The pipe or tube which is inserted in the coupling may be a continuous cylindrical pipe or tube or it may be a pipe or tube made from a sheet with the edges fastened together by an overlapping joint at 14, Fig. 4. In such a construction there is usually a little depression where the edges of the material are connected together at 14, and this construction fills that depression completely so as to insure that there will be no leakage. In doing this, the end 7 is bent downwardly and the material thereof deformed and compressed into the recess at the joining point 14, as clearly shown at 15 in Fig. 7. This figure shows the recess somewhat enlarged in order to make the construction clear.

I prefer to have the inner end of the opening of the member 4 flared, as indicated in Fig. 5, so that there will be a line contact between the clamping member 5 and the part 4, and further to facilitate the entrance of the clamping member 5 into the member 4 so as to preserve a proper alignment of the parts under all the conditions presented. I also prefer to provide the clamping member 5 with a shoulder 5b. When the coupling is uncoupled and coupled a number of times, the end of the member 5 may become worn, and in that event the end of the member 4 will strike the shoulder 5b and press the clamping member 5 so as to bring the two inclined faces 5a and 11 into proper engaging connection.

I have illustrated a particular form of device embodying the invention, but it is of course evident that the parts may be varied in many particulars without departing from the spirit of the invention as embodied in the claims hereto appended, and I therefore do not limit myself to the particular construction shown.

The use and operation of my invention are as follows:

When the coupling is made up ready for use, the clamping element 5 is connected to the coupling member 4 by the solder 6 so as to form, as it were, a single element. When the coupling is to be made, the pipe 2, clamping element 5 and threaded member 4 are inserted in the coupling member 1. The coupling member 4 is then rotated so as to bring the external thread thereon in contact with the internal thread of the member 1. This rotation may be brought about by a tool or wrench which engages the part 4a. If desired, a wrench may also be placed on the member 1.

By realtively rotating the coupling members, the clamping element 5 is forced inwardly so that its inclined face engages the inclined face 11 of the member 1. Since the face 5a is curved or arced, the projection 7 is bent inwardly when the coupling member 4 is rotated, and compresses and deforms the pipe as shown at 12. When the pipe is formed with the joint as at 14, the pressure produced by tightening the nut 4 also causes the material of the part 7 to enter the small depression at the joint, as shown at 15, Fig. 7, so as to fill up this depression or groove and prevent any leak therethrough. The curved or arced face 5a on the part 5, when it engages the inclined face 11 on the coupling member 1, forms substantially a line contact, regardless of the surface condition of either of the parts and insures the proper deflecting or bending of the part 7 to make the proper compression on the pipe. The tightening up of the coupling member 4 also causes the pipe to move forward into the recess in the coupling member 1 formed by the inclined faces 3, and these inclined faces cause the ends of the pipe to flare outwardly, as it were, thus insuring a tight joint at this point.

During this movement of the part 4, the clamping element 5 becomes disengaged from the coupling member 4 and the solder 6 is spread out along the clamping element and the element 4 so as to form a tight joint between them, as clearly shown in Fig. 5. The movement of the coupling member 4 causes the inclined end of the coupling element 5 to slide into the inclined opening in the part 4, thereby causing the edge of the clamping element 5 to be bent inwardly so as to deform the pipe at a separate point, as at 13, to insure a tight joint at this point. The projection 7, engaging the inclined face 11, is forced inwardly so as to deform the pipe 2 and provide a tight point at this point. The other end of the clamping element is bent inwardly by the inclined face 10 of the coupling member 4 and also deforms the pipe at a separate point so as to insure a tight joint.

It will be seen that by means of this coupling a tight joint is insured and that the pipe is deformed at both ends of the clamping member 5 and that there is additionally a solder joint between the clamping element and the coupling member. It will further be seen that by means of this construction a complete seal is provided which prevents leaking through any part of the joint.

I claim:

1. A pipe coupling comprising a coupling member, a clamping element separate therefrom but connected thereto by means of solder and into which coupling member and clamping element the pipe to be coupled is received, said clamping element having two separated pipe deforming portions, a second coupling member having a threaded connection with the first coupling member and into which the clamping element is received, and means on the two coupling members for forcing the deforming portions of the clamping element toward the pipe when the coupling members are rotated relatively, the relative rotation of the coupling members disconnecting the clamping element from its associated coupling member, the said coupling member riding upon the clamping element and distributing the solder between the opposed faces thereof.

2. A pipe coupling comprising a coupling member, a clamping element separate therefrom but connected thereto by means of solder and into which coupling member and clamping element the pipe to be coupled is received, a second coupling member provided with engaging portions which engage the end of the pipe and the clamping element, the two coupling members having a threaded engagement, the coupling member to which the clamping element is connected riding upon said clamping element when the two coupling members are rotated relatively and distributing the solder between the engaging faces thereof.

MICHAEL L. SHULTZ.